Nov. 4, 1958    V. A. MISEK    2,859,342
ELECTRONIC PHASE SHIFTER
Filed Aug. 24, 1954
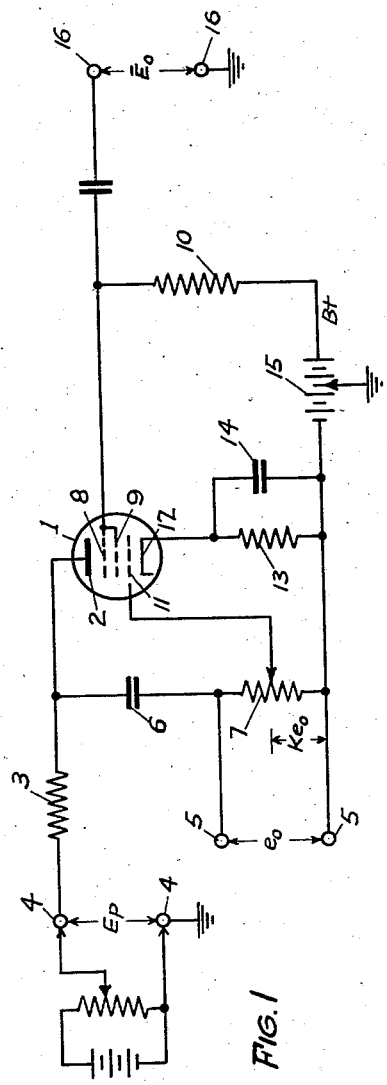
Fig. 1
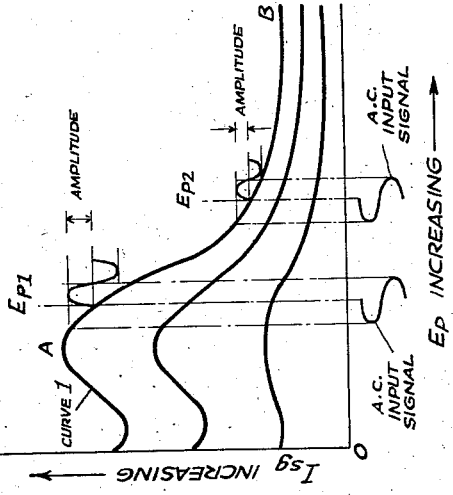
Fig. 2
Fig. 3
INVENTOR
VICTOR A. MISEK
BY Elmer J. Gorn
ATTORNEY U̇nited States Patent Office 2,859,342
Patented Nov. 4, 1958

2,859,342

ELECTRONIC PHASE SHIFTER

Victor A. Misek, Nashua, N. H., assignor to Raytheon Manufacturing Company, Waltham, Mass., a corporation of Delaware Application August 24, 1954, Serial No. 451,919

5 Claims. (Cl. 250—27)

This invention relates generally to phase-shifting networks, and more particularly to such a network wherein the output phase and amplitude of an alternating signal voltage input may be controlled by the application of a direct current voltage to an element of a thermionic vacuum tube.

A main object of this invention is to provide improved means for simply and efficiently controlling the phase of a voltage signal which overcomes numerous disadvantages encountered in systems presently in vogue. To accomplish this result, a novel electronic arrangement is employed which utilizes the interaction of the relative effects of plate voltage and control grid voltage on the flow of screen grid current in a pentode, tetrode, or similar device. The plate voltage-screen grid current and control grid voltage-screen grid current characteristic curves of these electronic devices are generally such that over a portion of the curves an increase in the positive direction of the voltage applied to the plate will be accompanied by a consequent decrease in the current flowing in the screen grid circuit, while, in contradistinction, an increase in the positive direction of the voltage applied to the control grid will be accompanied by a consequent increase in the flow of screen grid current. Since the slopes of these characteristics are of opposite sign, the output of an alternating voltage applied to the plate will be 180° out of phase with the output of an alternating voltage applied to the control grid.

In accordance with the invention, a novel arrangement is provided which allows a portion of the same alternating voltage input to be superimposed on both the plate and control grid, with control means also being provided to enable a selective balancing of the effects of the alternating voltages one against the other, thereby creating an effective variable phase-shifter which permits choice of an in-phase output, no output at all, or a 180° out-of-phase output, depending upon the setting selected for the control means.

Other objects and advantages as well as further insight into the principles of operation of the invention will become readily apparent as the following description proceeds, taken in conjunction with the accompanying drawings, wherein:

Fig. 1 is a schematic diagram of one form of embodiment of the phase control network according to the invention;

Fig. 2 represents the $E_p$ v. $I_{sg}$ of a typical tetrode utilized in accordance with the invention; and Fig. 3 represents the $E_g$ v. $I_{sg}$ characteristic curve of a typical tetrode utilized in accordance with the invention.

Referring now to Fig. 1, there is shown a pentode designated generally at 1, having its plate 2 connected through resistor 3 to a source of direct current control voltage $E_p$ applied to terminals 4, one of which is grounded. This voltage $E_p$ provides one means of effecting the desired phase control of an alternating voltage $e_0$ applied to terminals 5 in a manner which will be later explained. Suppressor grid 8 and screen grid 9 of pentode 1 are tied together internally, and connected through load resistor 10 to the positive side of a source of B+ bias voltage, here shown as a battery 15. Although suppressor grid 8 is shown tied to screen grid 9, it should be noted that it would be equally advantageous to tie it to plate 2, or to replace pentode 1 with a tetrode. The bias voltage for control grid 11 is supplied in a conventional manner by means of cathode resistor 13 and by-pass condenser 14. Plate 2 of pentode 1 is also connected through blocking condenser 6 and resistor 7 to the negative side of battery 15. A potentiometer connection is provided between control grid 11 and resistor 7 in order that a portion, $ke_0$, of the alternating voltage input $e_0$ applied to the plate 2 may also be applied to the control grid.

Since pentode 1 is effectively connected as a tetrode in Fig. 1, the curves of Figs. 2 and 3, which have been chosen only for the purpose of illustrating the interaction of the various currents and voltages, are those of a typical tetrode. However, it should be understood that the invention is not limited to such a connection. It would be equally feasible to have pentode 1 connected as a pentode, in which case characteristic curves of a pentode having generally similar shapes to those shown in Figs. 2 and 3 would be applicable.

Referring now to Fig. 2, wherein is shown a typical plate voltage-screen grid current characteristic of a tetrode, it can be seen that the curve presents certain portions over which an increase in plate voltage results in a decrease in the value of screen grid current or, in other words, the curve has a negative slope, such a portion being depicted by way of example at A—B on curve 1. When pentode 1 is operated on a portion of the curve which allows this effect to occur, the application of the alternating voltage $e_0$ to plate 2, superimposed on the D. C. voltage $E_p$, causes more or less current to flow through resistor 10 in the screen grid circuit, depending upon the instantaneous value of the plate voltage. Since the total instantaneous voltage on screen grid 8 is always less than the partial potential of battery 15 by the instantaneous voltage drop through resistor 10, as the screen grid current decreases, less drop appears across resistor 10, and the potential on screen grid 8 must necessarily increase. An alternating voltage output $\bar{E}_0$ in phase with the applied voltage $e_0$ thus tends to appear at terminals 16, one of which is connected to screen grid 8, while the other is grounded.

Simultaneously with the application of the voltage $e_0$ to plate 2, a portion of $e_0$, shown in Fig. 1 as $ke_0$, is applied to control grid 11 of pentode 1. The effect of this voltage $ke_0$ on the flow of screen grid current is opposite to that of $e_0$, i. e., an increase in the voltage applied to grid 11 will cause an increase in screen grid current rather than a decrease, as is shown by reference to Fig. 3. The alternating voltage $\bar{E}_0$ which tends to appear at terminals 16, due to the voltage $ke_0$, is thus 180° out of phase with that due to $e_0$, since the increase in screen grid current will cause a decrease in the voltage on screen grid 8. The value of $k$ is so chosen by proper selection of the bias voltages on plate 2, control grid 11, and screen grid 9 that a neutral condition can be established where the influence of $e_0$ on screen grid current flow is balanced by the influence of $ke_0$, so that no alternating voltage is developed across resistor 10.

From the foregoing it is thus apparent that the screen grid current can be made a function of $E_p$, $e_0$, and $ke_0$. With all other parameters held constant, the value of $E_p$ can be varied, such that $e_0$ exerts more, less, or equal influence upon the screen grid current when compared to the influence exerted by $ke_0$. Since the flow of screen grid current due to $e_0$ alone tends to produce an output voltage which is 180° out of phase with that which the screen grid current flow due to $ke_0$ tends to produce, when $e_0$ and $ke_0$ exert equal and opposite influences, no output voltage $\bar{E}_0$ appears at terminals 16. However, when $E_p$ is varied about this null point, a vector voltage $\bar{E}_0$ will appear at terminals 16 which is either in phase or 180° out of phase with input $e_0$, depending upon whether $e_0$ or $ke_0$ exerts the greater influence on screen grid current flow.

The amplitude of vector output voltage $\bar{E}_0$ varies with the amount by which $E_p$ is deviated from the null point, thereby providing a control of the amplitude of $\bar{E}_0$ as well as the relative phase. Amplitude control results from the fact that, as $E_p$ is varied, the operating point on the characteristic curve is shifted from point to point along the curve, the slope at each point being different. Reference to Fig. 2 shows the effect of variation of the direct current voltage $E_p$ on the amplitude of a superimposed alternating current voltage signal, which may be $e_0$, for example. With the same A. C. signal input, the amplitude of the screen grid current variation at $E_{p1}$ is greater than the amplitude at $E_{p2}$, thus causing a proportional variation in the amplitude of output voltage $\bar{E}_0$.

It should also be apparent that, with a balanced condition existing as described above, the effects of $e_0$ and $ke_0$ on the flow of screen grid current can be selectively controlled by varying the connection of control grid 11 along resistor 7, thereby providing an alternative method of obtaining the desired phase shift.

It becomes obvious that useful application of the invention is found in a myriad of instances, where it is desirable to have quick, easy and efficient means of providing a variable phase output voltage. For example, the phase reversal control in accordance with this invention can be utilized in servo applications where A. C. motor reversal control is required, and is particularly applicable in the reverse control of low power split phase motors. At the present time, the usual method of providing this control employs some form of rectifier bridge-type phase-reversal arrangement. The control as contemplated by this invention differs radically from the rectifier bridge-type in that the bridge is replaced by a vacuum tube, with resulting advantages of greater stability with respect to temperature and aging, greater sensitivity, high input impedances, and insensitivity to poor B+ regulation.

While there has been described what is considered to be a preferred embodiment of this invention, it should be understood that other adaptations and variations thereof may be constructed without departure from the spirit of the invention as defined in the appended claims.

What is claimed is:

1. An electronic phase-shifting network comprising a thermionic vacuum tube having a plate, a cathode, and at least a control grid and a screen grid interposed in the electron discharge path between said cathode and said plate, a source of alternating voltage connected to said plate and to said control grid, means for applying said alternating voltage to said plate and simultaneously applying a portion of said voltage to said control grid, an output circuit connected to said screen whereby current flows in said screen grid and said output circuit connected thereto, and means adapted to control the effect of said alternating voltage on the flow of screen grid current in said output circuit whereby an output voltage of controlled phase and amplitude is obtained.

2. An electronic phase-shifting network comprising a thermionic vacuum tube having a plate, a cathode, and at least a control grid and a screen grid interposed in the electron discharge path between said cathode and said plate, a source of alternating voltage connected to said plate and to said control grid, means for applying said alternating voltage to said plate and simultaneously applying a portion of said voltage to said control grid, an output circuit connected to said screen grid whereby current flows in said screen grid and said output circuit connected thereto, and means connected to said plate for controlling the relative influence of each portion of said alternating voltage on the flow of screen grid current in said output circuit to obtain an output voltage of controlled phase and amplitude.

3. An electronic phase-shifting network comprising a thermionic vacuum tube having a plate, a cathode, and at least a control grid and a screen grid interposed in the electron discharge path between said cathode and said plate, a source of alternating voltage connected to said plate and to said control grid, means for applying said alternating voltage to said plate and simultaneously applying a portion of said voltage to said control grid, a source of direct current voltage connected to said plate, and an output circuit connected to said screen grid whereby current flows in said screen grid and said output circuit connected thereto, said means for applying said portion of said alternating voltage to said control grid being variable to allow control of the relative influence of each portion of said alternating voltage on the flow of screen grid current in said output circuit to obtain an output voltage of controlled phase and amplitude.

4. An electronic phase-shifting network comprising a thermionic vacuum tube having a plate, a cathode, and at least a control grid and a screen grid interposed in the electron discharge path between said plate and said cathode, an input circuit connected to said plate and to said control grid, means for applying an alternating voltage received at said input circuit to said plate and for simultaneously applying a portion of said alternating voltage to said control grid, an output circuit connected to said screen grid whereby current flows in said screen grid and said output circuit connected thereto, means connected to said plate for placing the operating point of said tube on a portion of one of its characteristic curves, said portion having a negative slope, and means for varying the location of said operating point whereby an output voltage of controlled phase and amplitude is obtained in said output circuit.

5. An electronic phase-shifting network comprising a thermionic vacuum tube having a plate, a cathode, and at least a control grid and a screen grid interposed in the electron discharge path between said cathode and said plate, an output circuit connected to said screen grid whereby current flows in said screen grid and said output circuit connected thereto, a source of alternating voltage connected to said plate, means connected to said control grid and adapted to apply a portion of said alternating voltage to said control grid, a source of direct current voltage connected to said plate and controlling the relative influence of said alternating voltages on the flow of screen grid current in said output circuit, and means for varying the value of said direct current voltage to selectively allow said alternating voltage portions to control the flow of screen grid current in said output circuit whereby an output voltage of controlled phase and amplitude may be obtained.

References Cited in the file of this patent

UNITED STATES PATENTS

| | | |
|---|---|---|
| 2,414,475 | Marchand | Jan. 21, 1947 |
| 2,527,535 | Emmett | Oct. 31, 1950 |